(12) United States Patent
Kudelski

(10) Patent No.: US 10,419,800 B2
(45) Date of Patent: Sep. 17, 2019

(54) METHOD TO IDENTIFY THE ORIGIN OF A SECURITY MODULE IN PAY-TV DECODER SYSTEM

(75) Inventor: Henri Kudelski, Chexbres (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 14/111,776

(22) PCT Filed: Apr. 2, 2012

(86) PCT No.: PCT/EP2012/055938
§ 371 (c)(1),
(2), (4) Date: Feb. 11, 2014

(87) PCT Pub. No.: WO2012/139913
PCT Pub. Date: Oct. 18, 2012

(65) Prior Publication Data
US 2014/0229972 A1    Aug. 14, 2014

Related U.S. Application Data

(60) Provisional application No. 61/475,754, filed on Apr. 15, 2011.

(51) Int. Cl.
*H04N 21/266* (2011.01)
*H04N 21/418* (2011.01)
(Continued)

(52) U.S. Cl.
CPC ..... *H04N 21/266* (2013.01); *H04N 21/26606* (2013.01); *H04N 21/4181* (2013.01);
(Continued)

(58) Field of Classification Search
CPC ........... H04N 21/266; H04N 21/26606; H04N 21/4181; H04N 21/4623; H04N 21/835; H04N 21/8358
(Continued)

(56) References Cited

U.S. PATENT DOCUMENTS 4,271,476 A * 6/1981 Lotspiech ............... G06T 3/606
345/656
7,805,399 B2 * 9/2010 Pinder .............. H04N 21/63345
370/506
(Continued)

FOREIGN PATENT DOCUMENTS

WO    WO 2004/082286    9/2004

OTHER PUBLICATIONS

International Search Report issued in International Application No. PCT/EP2012/055938 dated Jun. 15, 2012.
(Continued)

*Primary Examiner* — Nasser M Goodarzi
*Assistant Examiner* — Jaycee Imperial
(74) *Attorney, Agent, or Firm* — Hoyng Rokh Monegier LLP; Ramin Amirsehhi

(57) ABSTRACT

A method to identify the origin of a security module in a pay-tv system comprising: receiving by the pay-tv decoder system at least a first stream, a second stream and a control word stream, the first and second streams being encrypted by a first and a second control word, respectively, extracting from the control word stream, entitlement messages containing a main control word allowing retrieval of the first and second control words and access conditions, transferring the control word stream to the security module and checking the access conditions, selecting a current control word from the first or second control word based on part of the internal parameter, transmitting the current control word to the pay-tv decoder, selecting a current stream from the first or second stream in accordance with the selection of the first or second control word, and decrypting the current stream with the current control word.

24 Claims, 1 Drawing Sheet

(51) Int. Cl.
*H04N 21/4623* (2011.01)
*H04N 21/835* (2011.01)
*H04N 21/8358* (2011.01)

(52) U.S. Cl.
CPC ....... *H04N 21/4623* (2013.01); *H04N 21/835* (2013.01); *H04N 21/8358* (2013.01)

(58) Field of Classification Search
USPC .......................................................... 725/31
See application file for complete search history.

(56) References Cited

U.S. PATENT DOCUMENTS

| | | | |
|---|---|---|---|
| 8,839,284 B2* | 9/2014 | Williamson et al. | 725/28 |
| 2002/0116705 A1* | 8/2002 | Perlman | H04N 5/4401 |
| | | | 725/31 |
| 2002/0133701 A1 | 9/2002 | Lotspiech et al. | |
| 2008/0037779 A1* | 2/2008 | Seman, Jr. | H02J 7/0004 |
| | | | 380/46 |
| 2009/0080689 A1* | 3/2009 | Zhao et al. | 382/100 |
| 2009/0097659 A1* | 4/2009 | Candelore | 380/278 |
| 2010/0027684 A1 | 2/2010 | Zou et al. | |
| 2010/0169349 A1 | 7/2010 | Zou et al. | |
| 2011/0219396 A1* | 9/2011 | Kudelski | H04L 9/0877 |
| | | | 725/31 |
| 2012/0191724 A1* | 7/2012 | Tucek | G06F 17/30073 |
| | | | 707/747 |
| 2013/0247089 A1* | 9/2013 | Kummer et al. | 725/31 |

OTHER PUBLICATIONS

Written Opinion issued in International Application No. PCT/EP2012/055938 dated Jun. 15, 2012.

\* cited by examiner

METHOD TO IDENTIFY THE ORIGIN OF A SECURITY MODULE IN PAY-TV DECODER SYSTEM

CROSS REFERENCE TO RELATED APPLICATIONS

This application is a U.S. National Stage Application of International Application No PCT/ P2012/055938 filed Apr. 2, 2012, which claims priority from US Provisional Patent Application No. 61/475,754 filed Apr 14, 2013.

INTRODUCTION

The present invention relates to the domain of conditional access systems and more particularly to methods for uncovering the identity of an apparatus used in the practice of unauthorised redistribution of secret encryption keys.

STATE OF THE ART

One area in which the present invention may be of particular interest is in the domain of pay-TV, where broadcast proprietary audio/video content is offered by an operator at a fee to a plurality of subscribing consumers. Conditional access systems are employed to handle the processing of pay-TV content, with a view to ensuring that only consumers who have subscribed to certain services, usually by payment of a fee to the operator or provider of those services, actually have access to the content provided for those services. According to such conditional access systems, the content is encrypted by the operator under control words, the latter being supplied to the subscribing consumers via security messages, which are either broadcast in a data stream along with the content or may be distributed by some other means. Each subscribing consumer is supplied with an appropriate receiver comprising a security module to allow for the extraction of the control words from the security messages and a descrambling unit for decrypting the broadcast encrypted audio/video content.

Encrypted audio/video content has value and as such, conditional access systems have been the target for attack by malicious third parties intent on gaining access to the audio/video content without subscribing to the services of the operator and without being in possession of the necessary authorised reception equipment. A practice commonly known as control word sharing, whereby the control words broadcast along with encrypted content are extracted by a malicious third party using valid security modules and re-distributed freely to other malicious third parties, is a particularly significant threat to operators offering pay-TV services since it deprives them of revenue from which they would otherwise have benefited.

Pay-TV operators therefore have a great interest in being able to trace receiver units which are used in control word sharing activities as this allows the operator to take action against those involved in such activities. United States Patent Application Publication No. 2002/0,133,701A describes a method for tracing traitor receivers in a broadcast encryption system. The method includes using a false key to encode plural subsets representing receivers in the system. The subsets are derived from a tree using a Subset-Cover system, and the traitor receiver is associated with one or more compromised keys that have been obtained by a potentially cloned pirate receiver. Using a clone of the pirate receiver, the identity of the traitor receiver is determined. This system however has the disadvantage that multiple encodings of the same content have to be broadcast, thus having a negative impact on broadcast bandwidth efficiency.

BRIEF DESCRIPTION OF THE INVENTION

This invention proposes a solution to identify the origin of a security module in pay-tv system according to the following method:

Method to identify the origin of a security module in pay-tv decoder system comprising the steps of:
- receiving by the pay-tv decoder system a service comprising at least a first stream, a second stream and a control word stream, said first stream being encrypted by a first control word (CW1) and said second stream being encrypted by a second stream (CW2),
- extracting from the control word stream, entitlement messages containing at least one main control word (CW) allowing to retrieve the first and the second control words, and access conditions,
- transferring the control word stream to the security module,
- extracting the entitlement messages from the control word stream and checking the access conditions,
- if the access conditions are met, determining the first and second control words from the main control word in the entitlement message,
- determining an internal parameter of the security module, this internal parameter being unique per security module,
- selecting a current control word from the first or the second control word based on part of the internal parameter, corresponding to the first or the second stream,
- transmitting the current control word to the pay-tv decoder,
- selecting a current stream from the first or the second stream in accordance with the selection of the first or the second control word,
- decrypting the current stream with the current control word.

BRIEF DESCRIPTION OF THE FIGURES

This invention will be better understood thanks to the attached figures in which:
the FIG. 1 illustrates the devices of the invention, namely a pay-tv decoder system,
the FIG. 2 illustrates the resulting stream.

DESCRIPTION OF THE INVENTION

Figure 1:
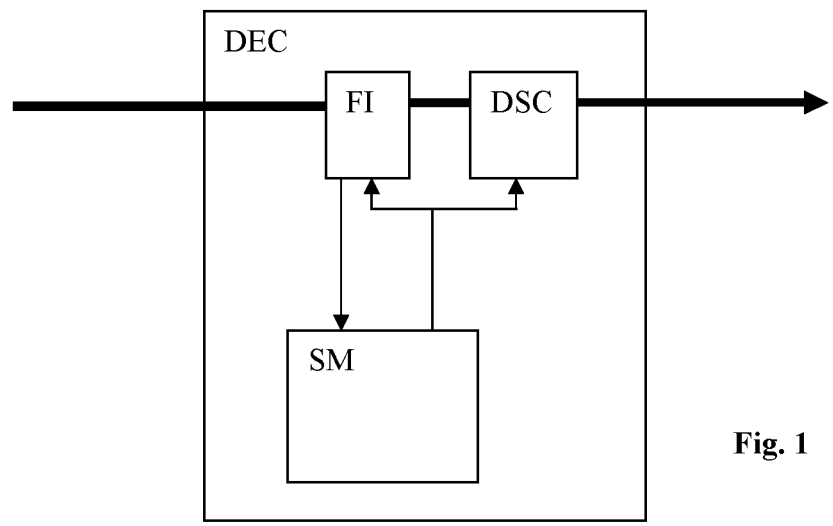

The present invention proposes to duplicate at least one of the elementary streams of a service and to encrypt this supplemental stream by a particular control word. A service comprises several elementary streams assembled together to form a service, such as a video stream, an audio stream and data stream (for carrying the control messages ECM).

These elementary streams are described in the PMT (Program Map Table). The Program Map Tables (PMTs) contain information about services. For each service, there is one PMT. The PMTs provide information on each service present in the transport stream, including the program_number, and list the elementary streams that comprise the described MPEG-2 program. There are also locations for optional descriptors that describe the entire MPEG-2 program, as well as an optional descriptor for each elementary stream. Each elementary stream is labeled with a stream_type value.

The present invention will describe as an example the duplication of an audio stream. However, the same method can be applied with a video stream in case that the bandwidth is not an issue.

As it is well known from the man skilled in the art, the security module can essentially be realised according to four distinct forms. One of these forms is a microprocessor card, a smart card, or more generally an electronic module (taking the form of key, a badge, . . . ). Such a module is generally removable and connectable to the decoder.

The form with electric contacts is the most widely used, but a connection without contact for example of the type ISO 14443 is not excluded.

A second known form is that of an integrated circuit box, generally placed definitively and irremovably in the decoder. An alternative is made up of a circuit mounted on a base or connector such as a SIM module connector.

In a third form, the security module is integrated into an integrated circuit box also having another function, for example in a descrambling module of the decoder or in the microprocessor of the decoder.

In a fourth embodiment, the security module is not realised in hardware, but its function is implemented only in software form. Given that in the four cases, the function is identical although the security level differs, we can talk about a security module regardless of the way in which its function is carried out or the form that this module may take.

The audio stream is duplicated, each audio stream is then encrypted by a different key or control word.

Both encrypted streams (audio1, audio2) are then assembled with the other streams to form the service. The various streams are identified in the PMT and the keys for the first and the second audio stream are included in the data stream.

The keys, also named Control-Words are embedded into Entitlement Control Messages which comprises also the right requirements for having access to the encrypted content. In general, a message contain the current control-word and the next control-word i.e. the control word that applies on the future data when after a key change.

According to a first embodiment, the message comprises four control-words, two by streams (current and next). According to another embodiment, two messages are provided to the security module, each message being dedicated to only one stream.

Since the service comprises several streams, and only one is duplicated, the method of the invention is preferably based on the use of three control words. One (CW1) for the first stream, one (CW2) for the duplicated first stream, and one (CW3) for the other streams. As far as the decoder is concerned, only two control words will be provided at a time, i.e. CW1 and CW3 or CW2 and CW3 by the security module.

The security module process the received message, i.e. decrypt the same with a transmission key pertaining to the broadcasting system and extract the access conditions as well as the control-words.

The security module verifies that the access conditions are met, i.e. the memory of the security module contains the rights referred by the access conditions. These rights are loaded into the security module preferably by messages uniquely addressed to said security module and encrypted by a personal key of this security module.

Each security module (SM) in a collection of security modules (SM) managed by the operator (OP) is uniquely identifiable by an internal setting (UA) which is particular to the security module (SM). Each security module (SM) is instructed to select one of the control words (CW) according to its unique internal setting (UA). The internal setting (UA) could be for example the value of a register representing the security module's unique address. Preferably, the security module (SM) is instructed to select the control word (CW) according to the value of the nth bit of its unique address for example.

For the sake of understanding the control word for the first steam will be named first control word CW1, the control word for the duplicated steam (second stream) will be named second control word CW2, and the control word for the other stream (or streams) will be named third control word CW3.

As a consequence, based on an internal parameter, the security module selects the first of the second control-word and returns it to the decoder. The control words used for the decryption of the streams are not necessarily extracted for the ECM. The security module can extract one main control word from the ECM and produce the first and the second words with a cryptographic function from the third control word.

This function will be preferably initialized by a parameter known by all security modules. Of course, any one of the control word can be used as initial control word to produce the other control words.

It is important that the decoder selects the correct stream with the corresponding control word. This can be done by different means i.e. by an instruction of the security module or by the decoder itself.

In the same way that the security module sends instructions to the decoder DEC, the security module informs the decoder of the stream to be processed. It is worth noting that the decoder has set the filter F1 of the elementary to both streams. Only one among the first or second stream is selected to be passed to the descrambler DSC. The information received from the security module will be used to select the proper stream among the streams, preferably when the control word changes. The decoder stores temporary the stream selection and analyses the current stream. When a control-word change is detected, the new stream selection is applied so that the descrambler receives the correct stream matching the control-word received previously.

In case that the decoder can decide itself on which stream is to the processed, the decoder is aware of the internal parameter used for the selection and applies the same selection. The unique address UA of the security module is known by the decoder.

In a particular embodiment of the present invention, an initialised sweep register (CNTR) is used to point to a particular bit in the unique address of the security module. When initialised, the sweep register points to the first bit of the unique address and the state of that bit (i.e.,its binary value of 1 or 0) is used to select one from the two control words. When the selection has been made the sweep register increments and the next bit of the unique address is used to select one of the first or second control words. This process is continued until all of the bits of the unique address have been used, whereupon the sweep register is reinitialised. The control words from the security messages may be processed as and when they arrive or they may be stored in a control word table (CWT) and processed on demand or according to a time-based regime.

Figure 2:
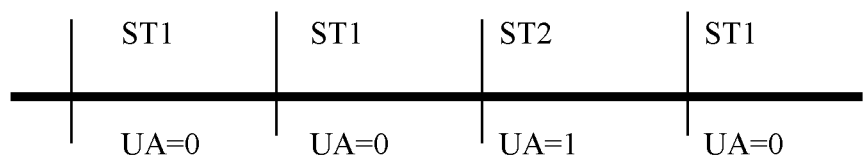

The FIG. 2 illustrates the result of the streams after the selection of the first (ST1) or second (ST2) stream according to the state of the corresponding bit of the internal parameter UA.

According to another embodiment of the present invention, rather than the command driven processing described above, a more automated method may be used. In this embodiment the security message (ECM) or the management message (EMM) further comprises information related to time—time of day for example. This information may be used to further indicate at what time the selection of the control word should be made. It is then possible to send a command to a group of security modules to determine if a member of that group is used fraudulently. In the positive event, the size of the group can be reduced until the proper security module is located.

The advantage of the turning on or off this dual control word method is to select the time when a duplicate stream is present. It is not necessary to duplicate a stream at all time, the method can be started for a short period, thus reducing the impact on the bandwidth.

Furthermore, a hash function performed on the time-related information yields a value which may be used to point to a particular bit of the unique address to use in selecting one from the pair of control words. For example, for a 32-bit unique address, a modulo-32 of the result of the hash of the time-related information would point to one of the 32 bits from the unique address.

According to another aspect of the invention, the duplicate stream is not a copy of the first stream. The second stream contains some modification such as watermarking in a way that the modifications are visually undetectable by the end user. As a consequence, the resulting output of the descrambler will alternatively contain the first and the second stream, the change from the first to the second being dictate by the internal parameter of the descrambler.

The invention claimed is:

1. A method for processing a content in a manner that allows an origin of a security module in a decoder system to be identified, the method comprising:
   receiving by the decoder system a service comprising at least a first stream, a second encrypted stream and a control word stream, said first stream being encrypted by a first control word, said second stream being encrypted by a second control word, and said first and second streams carrying the same audio or video information;
   extracting, by the decoder, entitlement messages from the control word stream, the entitlement messages containing access conditions and at least one main control word that facilitates the retrieval of the first and the second control words;
   transferring, by the decoder, the control word stream to the security module;
   extracting, by the security module, the entitlement messages extracted from the control word stream, wherein upon receipt of the at least one main control word the security module has sufficient information to decrypt both the first and second streams, and checking the access conditions;
   selecting, by the security module, a current control word corresponding to the first or the second stream from the first or the second control word based in part on an internal parameter, the internal parameter comprising a value of a register representing a unique address of the security module comprising a plurality of bits, and the internal parameter being unique per security module, the selecting comprising:
      determining a binary value of a specified bit of the unique address, wherein the specified bit is a particular bit of the plurality of bits in the unique address of the security module;
      selecting the current control word corresponding to the first stream in response to determining the binary value is 0; and
      selecting the current control word corresponding to the second stream in response to determining the binary value is 1;
   determining, by the security module, the current control word using the main control word in the entitlement messages;
   transmitting by the security module the current control word to the decoder;
   selecting, by the decoder, a current stream from the first or the second stream in accordance with the selection of the first or the second control word; and
   decrypting, by the decoder, the current stream with the current control word, thereby generating a decrypted stream identified as originating at the security module due to a pattern of decrypted data within the decrypted stream that is decrypted according to the control word matching the specified bit of the unique address of the security module.

2. The method of claim 1, wherein the entitlement message comprises the first and the second control words.

3. The method of claim 1, wherein the first control word and the second control word are calculated from the main control word using a cryptographic function.

4. The method of claim 3, wherein the cryptographic function is initialized by a parameter common to all security modules.

5. The method of claim 1, wherein the selection of the current stream by the decoder is triggered by an instruction received from the security module.

6. The method of claim 1, wherein the selection of the current stream by the decoder is triggered by the selection of the same part of the internal parameter by the decoder.

7. The method of claim 1, wherein at least the first stream comprises a mark distinguishing said first stream from said second stream.

8. The method according to claim 7, wherein the first stream is an audio stream and the mark is an imperceptible audio mark.

9. The method according to claim 7, wherein the first stream is a video stream and the mark is an imperceptible video mark.

10. The method of claim 1, further comprising:
   a. initializing a sweep register pointing to the first bit of the unique address;
   b. using the sweep register to point to a bit of the unique address;
   c. using the state of said bit to select the current control word;
   d. incrementing the sweep register to point to the next bit of the unique address each time the selection of a current control word from the first or the second control word is performed;
   e. repeating the steps b to d until all of the bits of the unique address have been used; and
   f. reinitializing the sweep register.

11. The method of claim 1, further comprising applying, by the security module, a hash function to time-related information to obtain the value of the specified bit.

12. The method of claim 1, wherein determining the current control word comprises applying a cryptographic function to the main control word.

13. A device comprising:
a decoder; and
a security module in communication with the decoder;
wherein the device is configured to:
    receive, by the decoder, a service comprising at least a first stream, a second stream and a control word stream, the second stream being a duplicate of the first stream, said first stream being encrypted by a first control word, said second stream being encrypted by a second control word, and said first and second streams carrying the same audio or video information;
    extract, by the decoder, entitlement messages from the control word stream, the entitlement messages containing access conditions, and at least one main control word that facilitates the retrieval of the first and the second control words;
    transfer, by the decoder, the entitlement messages extracted from the control word stream to the security module;
    extract, by the security module, the entitlement message from the control word stream, wherein upon receipt of the at least one main control word the security module has sufficient information to decrypt both the first and second steams, and check the access conditions;
    select, by the security module, a current control word corresponding to the first or the second stream from the first or the second control word based in part on an internal parameter, the internal parameter comprising a value of a register representing a unique address of the security module comprising a plurality of bits, and the internal parameter being unique per security module, the device being configured to select the current control word by:
        determining a binary value of a specified bit of the unique address, wherein the specified bit is a particular bit of the plurality of bits in the unique address of the security module;
        selecting the current control word corresponding to the first stream in response to determining the binary value is 0; and
        selecting the current control word corresponding to the second stream in response to determining the binary value is 1;
    transmit, by the security module, the current control word to the decoder;
    select, by the decoder, a current stream from the first or the second stream in accordance with the selection of the first or the second control word; and
    decrypt, by the decoder, the current stream with the current control word, thereby generating a decrypted stream identified as originating at the security module due to a pattern of decrypted data within the decrypted stream that is decrypted according to the control word matching the specified bit of the unique address of the security module.

14. The device of claim 13, wherein the entitlement message comprises the first and the second control words.

15. The device of claim 13, wherein the first control word and the second control word are calculated from the main control word using a cryptographic function.

16. The device of claim 15, wherein the cryptographic function is initialized by a parameter common to all security modules.

17. The device of claim 13, wherein the selection of the current stream by the decoder is triggered by an instruction received from the security module.

18. The device of claim 13, wherein the selection of the current stream by the decoder is triggered by the selection of the same part of the internal parameter by the decoder.

19. The device of claim 13, wherein at least the first stream comprises a mark distinguishing said first stream from said second stream.

20. The device of claim 19, wherein the first stream is an audio stream and the mark is an imperceptible audio mark.

21. The device of claim 19, wherein the first stream is a video stream and the mark is an imperceptible video mark.

22. The device of claim 13, further comprising a sweep register, wherein the security module is further configured to:
a. initialize the sweep register pointing to the first bit of the unique address;
b. use the sweep register to point to a bit of the unique address;
c. use the state of said bit to select the current control word;
d. increment the sweep register to point to the next bit of the unique address each time the selection of a current control word from the first or the second control word is performed;
e. repeat the steps b to d until all of the bits of the unique address have been used; and
f. reinitialize the sweep register.

23. The device of claim 13, wherein the security module is further configured to apply a hash function to time-related information to obtain the value of the specified bit.

24. The device of claim 13, wherein determining the current control word comprises applying a cryptographic function to the main control word.

* * * * *